(12) United States Patent
Song et al.

(10) Patent No.: US 11,521,169 B2
(45) Date of Patent: Dec. 6, 2022

(54) METHOD AND APPARATUS FOR PRODUCING ORDER

(71) Applicants: Beijing Jingdong Shangke Information Technology Co., Ltd., Beijing (CN); Beijing Jingdong Century Trading Co., Ltd., Beijing (CN)

(72) Inventors: Dewei Song, Beijing (CN); Wenjie Liu, Beijing (CN)

(73) Assignees: Beijing Jingdong Shangke Information Technology Co., Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 200 days.

(21) Appl. No.: 16/959,319

(22) PCT Filed: Jan. 11, 2019

(86) PCT No.: PCT/CN2019/071370
§ 371 (c)(1),
(2) Date: Jun. 30, 2020

(87) PCT Pub. No.: WO2019/137478
PCT Pub. Date: Jul. 18, 2019

(65) Prior Publication Data
US 2020/0372453 A1   Nov. 26, 2020

(30) Foreign Application Priority Data

Jan. 11, 2018  (CN) .......................... 201810027165.6

(51) Int. Cl.
*G06Q 30/00*   (2012.01)
*G06Q 10/08*   (2012.01)
*G06Q 50/30*   (2012.01)

(52) U.S. Cl.
CPC ..... *G06Q 10/087* (2013.01); *G06Q 10/08355* (2013.01); *G06Q 50/30* (2013.01)

(58) Field of Classification Search
CPC . G06Q 10/087; G06Q 10/08355; G06Q 50/30
See application file for complete search history.

(56) References Cited

U.S. PATENT DOCUMENTS

2006/0242018 A1* 10/2006 Shulman ............ G06Q 30/0226
705/14.27
2016/0342932 A1* 11/2016 Imaeda ................ G06Q 10/083

FOREIGN PATENT DOCUMENTS

CN    102982432 A    3/2013
CN    106203894 A    12/2016
(Continued)

OTHER PUBLICATIONS

Indian Examination Report for Indian Application No. 202017026064, dated Jun. 30, 2021, with translation, 6 pages.
(Continued)

*Primary Examiner* — Rokib Masud
(74) *Attorney, Agent, or Firm* — RatnerPrestia

(57) ABSTRACT

An order production method and device are provided. The method may include: dividing an order into a first sub-order and a second sub-order (201); determining a target site for delivery of the product combination (202); determining a first required time length for transporting a main product from a first warehouse to the target site and a second required time length for transporting promotional product of each second sub-order from a corresponding second warehouse to the target site (203); and determining, on the basis of the first required time length and the second required time length, a delivery time for delivering the main product from the first warehouse and a delivery time for delivering the promotional products from the second warehouse, to ensure (Continued)

that the time when the main product arrives at the target site is not later than the time that the promotional products arrive at the target site (204).

16 Claims, 6 Drawing Sheets

(56) References Cited

FOREIGN PATENT DOCUMENTS

| | | |
|---|---|---|
| CN | 108875260 A | 6/2017 |
| CN | 107025529 A | 8/2017 |
| CN | 107203858 A | 9/2017 |

OTHER PUBLICATIONS

International Search Report and Written Opinion for International Application No. PCT/CN2019/071370, dated Apr. 11, 2019, 5 pages.

\* cited by examiner

METHOD AND APPARATUS FOR PRODUCING ORDER

CROSS-REFERENCE TO RELATED APPLICATIONS

This application is a US National Stage of International Application No. PCT/CN2019/071370, which claims priority to Chinese Application No.201810027165.6, filed on Jan. 11, 2018 and entitled "Method and Apparatus for producing order," the entire contents of each of which are hereby incorporated by reference.

TECHNICAL FIELD

Embodiments of the present disclosure relate to the field of computer technology, specifically to the technical field of Internet, and more specifically to a method and apparatus for producing an order.

BACKGROUND

Nowadays, with the improvement of ones living standards, online shopping has gradually become an important consumption habit. At the same time, competition in the e-commerce industry is also intensifying. In order to attract more users, e-commerce platforms often initiate a variety of promotions (gift promotion, such as buying product A and getting product B, purchasing over N yuan and getting product B; and purchasing at a premium price, for example, after buying product A, a designated product B may be purchased at a price lower than the normal price of product B).

In the existing mode, users often place orders at the same time after selecting a plurality of products and adding them to the shopping carts, however, before delivery, e-commerce platforms may divide the orders into sub-orders that include main products and promotional products respectively according to production conditions of the orders and deliver to the users. Using this method to deliver products, if the promotional products are delivered to the users first, there may be a risk that some users may appropriate the promotional products in the orders, which may easily cause economic losses. For example, a user returns the main product after receiving the gift first, as the price of the gift is usually zero, in this regard the user has appropriated the gift in the order. However, if the promotional products are delivered later or delivered to the users at the same time, when the promotional products arrive at a site first, it may cause overstocking of a large number of promotional products at the site, and cause great manpower and material losses to the operation of the site.

SUMMARY

Embodiments of the present disclosure provides a method and apparatus for producing an order.

In a first aspect, some embodiments of the present disclosure provides a method for producing an order, the method includes: dividing, in response to receiving an order comprising a product combination sent by a user, the order into a first sub-order and a second sub-order, the first sub-order comprising at least one main product, the second sub-order comprising at least one promotional product associated with the main product, and each of the main product in the first sub-order being stored in a first warehouse, and each of the promotional product in the second sub-order being stored in a second warehouse; determining a target site for delivery of the product combination based on receiver address information in the order; determining, based on the determined target site, a first required time length for transporting the main product from the first warehouse to the target site and a second required time length for transporting the promotional product of each second sub-order from a corresponding second warehouse to the target site; and determining, based on the first required time length and the second required time length, a delivery time for delivering the main product from the first warehouse and a delivery time for delivering the promotional product from the second warehouse, so that a time when the main product arrives at the target site is not later than a time when the promotional product arrives at the target site.

In some embodiments, the dividing, in response to receiving an order comprising a product combination sent by a user, the order into a first sub-order and a second sub-order, includes: parsing, in response to receiving the order sent by the user, the order to extract at least one main product and a promotional product associated with each of the main product of the product combination; generating at least one first sub-order, so that main products stored in a same first warehouse are included in a same first sub-order; and generating at least one second sub-order, so that promotional products stored in a same second warehouse are included in a same second sub-order.

In some embodiments, the determining, based on the determined target site, a first required time length for transporting the main product from the first warehouse to the target site and a second required time length for transporting the promotional product of each second sub-order from a corresponding second warehouse to the target site, includes: acquiring address information of the target site, address information of the first warehouse, and address information of the second warehouse; determining, based on the address information of the first warehouse and the address information of the target site, the first required time length for each of the main product transporting from the first warehouse to the target site; and determining, based on the address information of the second warehouse and the address information of the target site, the second required time length for each of the promotional product transporting from the second warehouse to the target site.

In some embodiments, the determining, based on the first required time length and the second required time length, a delivery time for delivering the main product from the first warehouse and a delivery time for delivering the promotional product from the second warehouse, so that a time when the main product arrives at the target site is not later than a time when the promotional product arrives at the target site, includes: acquiring a list of shipment waves of the first warehouse to determine a shipment wave for the main product and a third time for delivering the main product from the first warehouse; determining a first time when the main product arrives at the target site based on the first required time length and the third time for delivering the main product from the first warehouse; determining a second time for the promotional product arriving at the target site, wherein the second time is not earlier than the first time; and determining a fourth time for delivering the promotional product from the second warehouse, based on the second time and the second required time length.

In some embodiments, the method further includes: acquiring a list of shipment waves of the second warehouse; determining whether there is a shipment wave whose shipping time is the fourth time in the list of shipment waves of the second warehouse; if yes, using the shipping time indicated by the shipment wave as the fourth time; and if no, determining a time indicated by a shipment wave whose shipping time is closest to the fourth time from the list of shipment waves as the fourth time.

In some embodiments, the method further includes: acquiring, for any one of the first sub-order, at least one warehouse storing the main product in the first sub-order and storage amount of the main product in each warehouse in which the main product in the first sub-order is stored; and in response to determining that a number of the main product stored in at least one warehouse in the warehouses storing the main product in the first sub-order meets a demand for a shipment amount of the main product, determining, from the at least one warehouse that meets the demand for the shipment amount of the main product, that a warehouse closest to the target site as the first warehouse corresponding to the first sub-order.

In a second aspect, some embodiments of the present disclosure provides an apparatus for producing an order, the apparatus includes: a dividing unit, configured to divide, in response to receiving an order comprising a product combination sent by a user, the order into a first sub-order and a second sub-order, the first sub-order comprising at least one main product, the second sub-order comprising at least one promotional product associated with the main product, and each of the main product in the first sub-order being stored in a first warehouse, and each of the promotional product in the second sub-order being stored in a second warehouse; a first determining unit, configured to determine a target site for delivery of the product combination based on receiver address information in the order; a second determining unit, configured to determine, based on the determined target site, a first required time length for transporting the main product from the first warehouse to the target site and a second required time length for transporting the promotional product of each second sub-order from a corresponding second warehouse to the target site; and a third determining unit, configured to determine, based on the first required time length and the second required time length, a delivery time for delivering the main product from the first warehouse and a delivery time for delivering the promotional product from the second warehouse, so that a time when the main product arrives at the target site is not later than a time when the promotional product arrives at the target site.

In some embodiments, the dividing unit is further configured to: parse, in response to receiving the order sent by the user, the order to extract at least one main product and a promotional product associated with each of the main product of the product combination; generate at least one first sub-order, so that main products stored in a same first warehouse are included in a same first sub-order; and generate at least one second sub-order, so that promotional products stored in a same second warehouse are included in a same second sub-order.

In some embodiments, the second determining unit is further configured to: acquire address information of the target site, address information of the first warehouse, and address information of the second warehouse; determine, based on the address information of the first warehouse and the address information of the target site, the first required time length for each of the main product transporting from the first warehouse to the target site; and determine, based on the address information of the second warehouse and the address information of the target site, the second required time length for each of the promotional product transporting from the second warehouse to the target site.

In some embodiments, the third determining unit is further configured to: acquire a list of shipment waves of the first warehouse to determine a shipment wave for the main product and a third time for delivering the main product from the first warehouse; determine a first time when the main product arrives at the target site based on the first required time length and the third time for delivering the main product from the first warehouse; determine a second time for the promotional product arriving at the target site, wherein the second time is not earlier than the first time; and determine a fourth time for delivering the promotional product from the second warehouse, based on the second time and the second required time length.

In some embodiments, the apparatus further includes: a first acquisition unit, configured to acquire a list of shipment waves of the second warehouse; a fourth determining unit, configured to determine whether there is a shipment wave whose shipping time is the fourth time in the list of shipment waves of the second warehouse; and if yes, using the shipping time indicated by the shipment wave as the fourth time; and if no, determining a time indicated by a shipment wave whose shipping time is closest to the fourth time from the list of shipment waves as the fourth time.

In some embodiments, the apparatus further includes: a second acquisition unit, configured to acquire, for any one of the first sub-order, at least one warehouse storing the main product in the first sub-order and storage amount of the main product in each warehouse in which the main product in the first sub-order is stored; and a fifth determining unit, configured to, in response to determining that a number of the main product stored in at least one warehouse in the warehouses storing the main product in the first sub-order meets a demand for a shipment amount of the main product, determine from the at least one warehouse that meets the demand for the shipment amount of the main product, that a warehouse closest to the target site as the first warehouse corresponding to the first sub-order.

The method and apparatus for producing an order provided by embodiments of the present disclosure, may divide a received order including a product combination into a first sub-order and a second sub-order, then determine a target site for delivery of the product combination based on receiver address information in the order, after that based on the target site, a first required time length for transporting the main product from the first warehouse to the target site and a second required time length for transporting the promotional product from the second warehouse to the target site, and finally determine, based on the first required time length and the second required time length, a delivery time for delivering the main product and a delivery time for delivering the promotional product, to ensure that the time when the main product arrives at the target site is not later than the time when the promotional product arrives at the target site, thereby preventing users from appropriating promotional products in product combinations and alleviating overstocking of products at a site.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the some embodiments in the present disclosure and some features in the disclosure may be combined with each other on a non-conflict basis. Features of the present disclosure will be described below in detail with reference to the accompanying drawings and in combination with embodiments.

Figure 1:
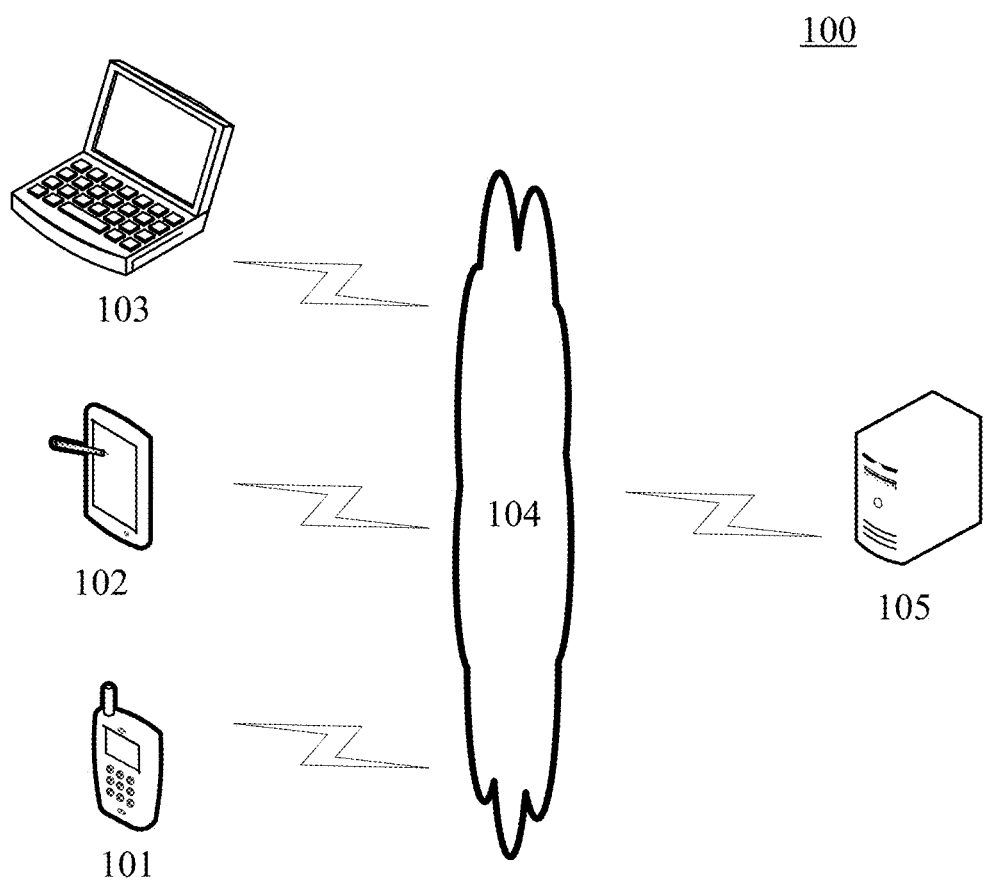
FIG. 1 is a diagram of an exemplary system architecture in which embodiments of the present disclosure may be implemented.

FIG. 1 illustrates an exemplary system architecture 100 of an embodiment of a method for producing an order or an apparatus for producing an order in which embodiments of the present disclosure may be implemented.

As shown in FIG. 1, the system architecture 100 may include terminal devices 101, 102, 103, a network 104, and a server 105. The network 104 is used to provide a communication link medium between the terminal devices 101, 102, 103 and the server 105. The network 104 may include various types of connections, such as wired, wireless communication links, or optic fibers.

The user may use the terminal devices 101, 102, 103 to interact with the server 105 via the network 104 to receive or send orders and the like. Various communication client applications, such as shopping applications, web browser applications, search applications, instant messaging tools, email clients, and social platform software, may be installed on the terminal devices 101, 102, and 103.

The terminal devices 101, 102, 103 may be various electronic devices having display screens and supporting online shopping, including but not limited to smart phones, tablets, e-book readers, MP3 players (Moving Picture Experts Group Audio Layer III), MP4 (Moving Picture Experts Group Audio Layer IV) players, laptop portable computers and desktop computers, and the like.

The server 105 may be a server that provides various services, such as a backend server that provides support to orders to be divided sent by the terminal devices 101, 102, and 103. The backend server may process a received to-be-divided order for division and delivery, etc., and feed back a processing result (for example, the delivery time of sub-orders after the order is divided) to the terminal devices.

It should be noted that the method for producing an order provided by the embodiments of the present disclosure is generally performed by the server 105, accordingly, the apparatus for producing an order is generally disposed in the server 105.

It should be understood that the number of terminal devices, networks, and servers in FIG. 1 is merely illustrative. Depending on the implementation needs, there may be any number of terminal devices, networks, and servers.

Figure 2:
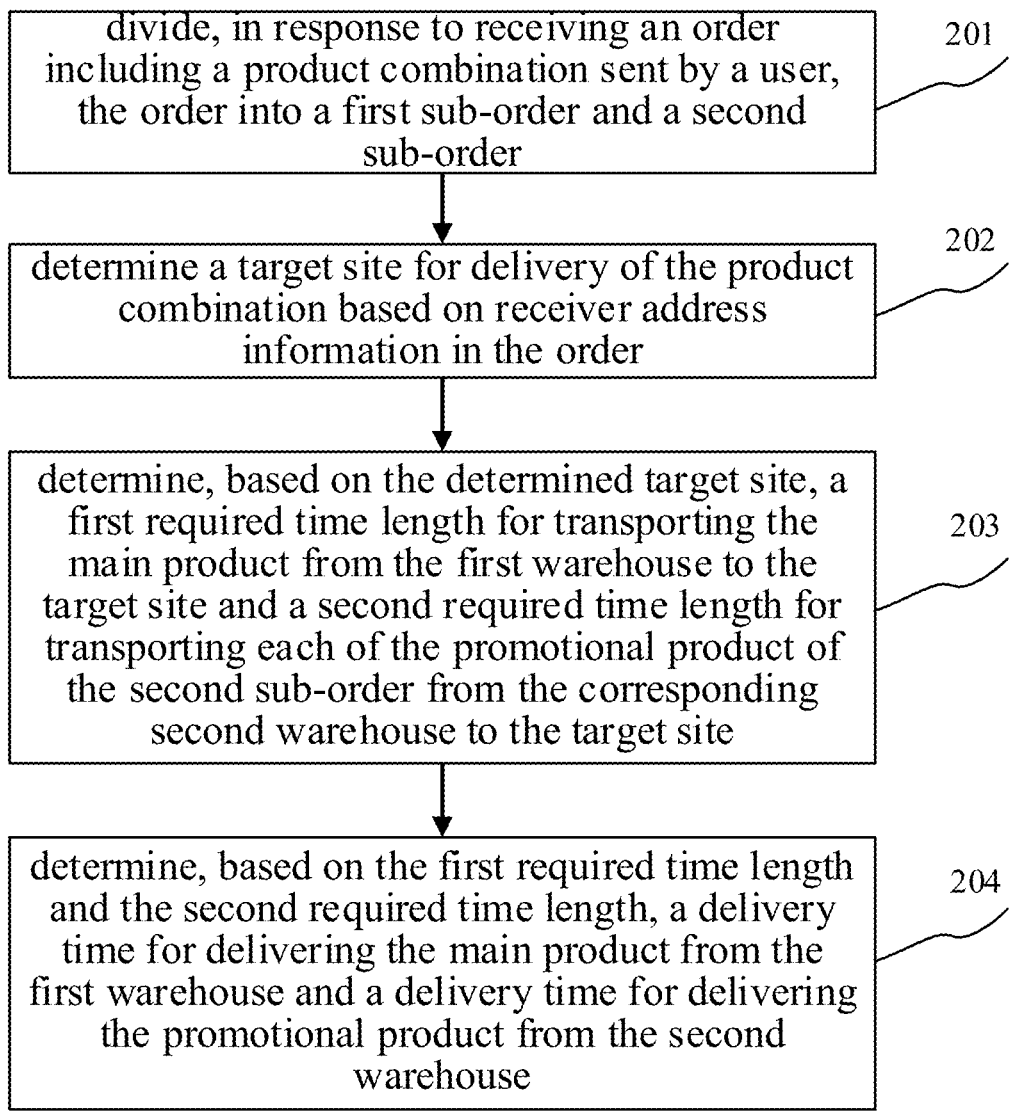
FIG. 2 is a flowchart of a method for producing an order according to an embodiment of the present disclosure.

With further reference to FIG. 2, a flow 200 of a method for producing an order according to an embodiment of the present disclosure is illustrated. The method for producing an order includes the following steps:

Step 201, dividing, in response to receiving an order including a product combination sent by a user, the order into a first sub-order and a second sub-order.

In the present embodiment, an electronic device (for example, the server shown in FIG. 1) on which the method for producing an order operates may receive the order including a product combination from a terminal device that the user uses for online shopping, etc. through a wired connection or a wireless connection, where the product combination may include a main product and a promotional product associated with the main product (for example, the main product and the promotional product may be product A and gift B for product A, respectively). Then, the received order including the product combination is divided into a plurality of sub-orders, and each sub-order may include a first sub-order and a second sub-order. Here, the first sub-order may include at least one main product, the second sub-order may include at least one promotional product associated with the main product, and each of the main product in the first sub-order may be stored in a first warehouse, and each of the promotional product in the second sub-order may be stored in a second warehouse. It should be noted that the wireless connection may include but is not limited to 3G/4G connection, WiFi connection, Bluetooth connection, WiMAX connection, Zigbee connection, UWB (ultra wideband) connection, and other wireless connection methods that are now known or to be developed in the future.

Generally, when the user makes a purchase using a shopping application installed on the terminal device, the electronic device may first determine whether the order sent by the user includes a product combination, for example, the order includes main product A and gift B for the main product A, then it may be determined that the order includes a product combination. After determining that the order includes the product combination, the electronic device may divide the order into a first sub-order and a second sub-order. For example, for the order that includes a main product A and gift B for the main product A, the order may be divided into a first sub-order including the main product A and a second sub-order including the gift B. Here, the main product A may be stored in the first warehouse, and gift B may be stored in the second warehouse.

In some alternative implementations of the present embodiment, when the electronic device receives the order including the product combination sent by the user, it may first parse the order to extract at least one main product in the product combination and a promotional product associated with each of the main product. Then, each main product and promotional product may be used to generate at least one first sub-order and at least one second sub-order, so that main products stored in the same first warehouse may be included in the same first sub-order, and promotional products stored in the same second warehouse may be included in the same second sub-order.

In some alternative implementations of the present embodiment, after extracting the main product in the product combination, the electronic device may acquire at least one warehouse storing the main product, and acquire storage amount of the main product in each warehouse. Then, warehouses whose storage amount of the main product meeting a demand for the shipment amount of the main product may be selected from the warehouses, so that the electronic device may determine, from the selected warehouses, the warehouse closest to the target site as the first warehouse for delivering the main product. Selecting the warehouse closest to the target site as the first warehouse so that the main product may be delivered to the target site as soon as possible. It may be understood that in addition to the distance factor affecting the time length for delivering the main product to the target site, traffic condition and the like are also influencing factors. Therefore, factors other than the distance may also be considered according to the actual situation to determine the first warehouse for delivering the main product.

Step 202, determining a target site for delivery of the product combination based on receiver address information in the order.

In the present embodiment, after the electronic device (for example, the server shown in FIG. 1) acquires the order including the product combination, it may extract the receiver address information from the order, and then determine the target site for delivery of the product combination based on the receiver address information. Typically, the determined target site may be the site closest to the receiver address, or the target site may also be a site where the staff can deliver the product combination to the receiver address as soon as possible.

Step 203, determining, based on the determined target site, a first required time length for transporting the main product from the first warehouse to the target site and a second required time length for transporting each of the promotional product of the second sub-order from the corresponding second warehouse to the target site.

In the present embodiment, after the electronic device divides to obtain the first sub-order and the second sub-order, it may determine a first warehouse for transporting the main product and a second warehouse for transporting the promotional product. Based on the target site determined in step 202, the electronic device may calculate the first required time length for transporting the main product from the determined first warehouse to the target site and the second required time length for transporting the promotional product from the determined second warehouse to the target site.

In some alternative implementations of the present embodiment, the electronic device may first determine the address information of the first warehouse for delivering the main product, the address information of the second warehouse for delivering the promotional product, and the address information of the target site. Then, based on the distance between the address information of the first warehouse and the address information of the target site, traffic condition and the like, the first required time length for transporting the main product from the first warehouse to the target site may be determined. Similarly, based on the distance between the address information of the second warehouse and the address information of the target site, traffic condition and the like, the second required time length for transporting the promotional product from the second warehouse to the target site may be determined.

Step 204, determining, based on the first required time length and the second required time length, a delivery time for delivering the main product from the first warehouse and a delivery time for delivering the promotional product from the second warehouse.

In the present embodiment, based on the first required time length determined in step 203, the electronic device may calculate the time when the main product arrives at the target site from the first warehouse when determining the delivery time for delivering the main product. In order to ensure that the time when the main product arrives at the target site is not later than the time when the promotional product arrives at the target site, the electronic device may determine the delivery time for delivering the promotional product from the second warehouse based on the second required time length. It can be seen that for any order, the main product arrives at the target site earlier than the promotional product, or the main product and the promotional product arrive at the target site at the same time, which may make the delivery of the promotional product to the receiver address not earlier than the main product, thus may avoid users from appropriating promotional products in product combinations, and at the same time, the promotional products arrive at the target site to avoid overstocking of promotional products at a site.

Figure 3:
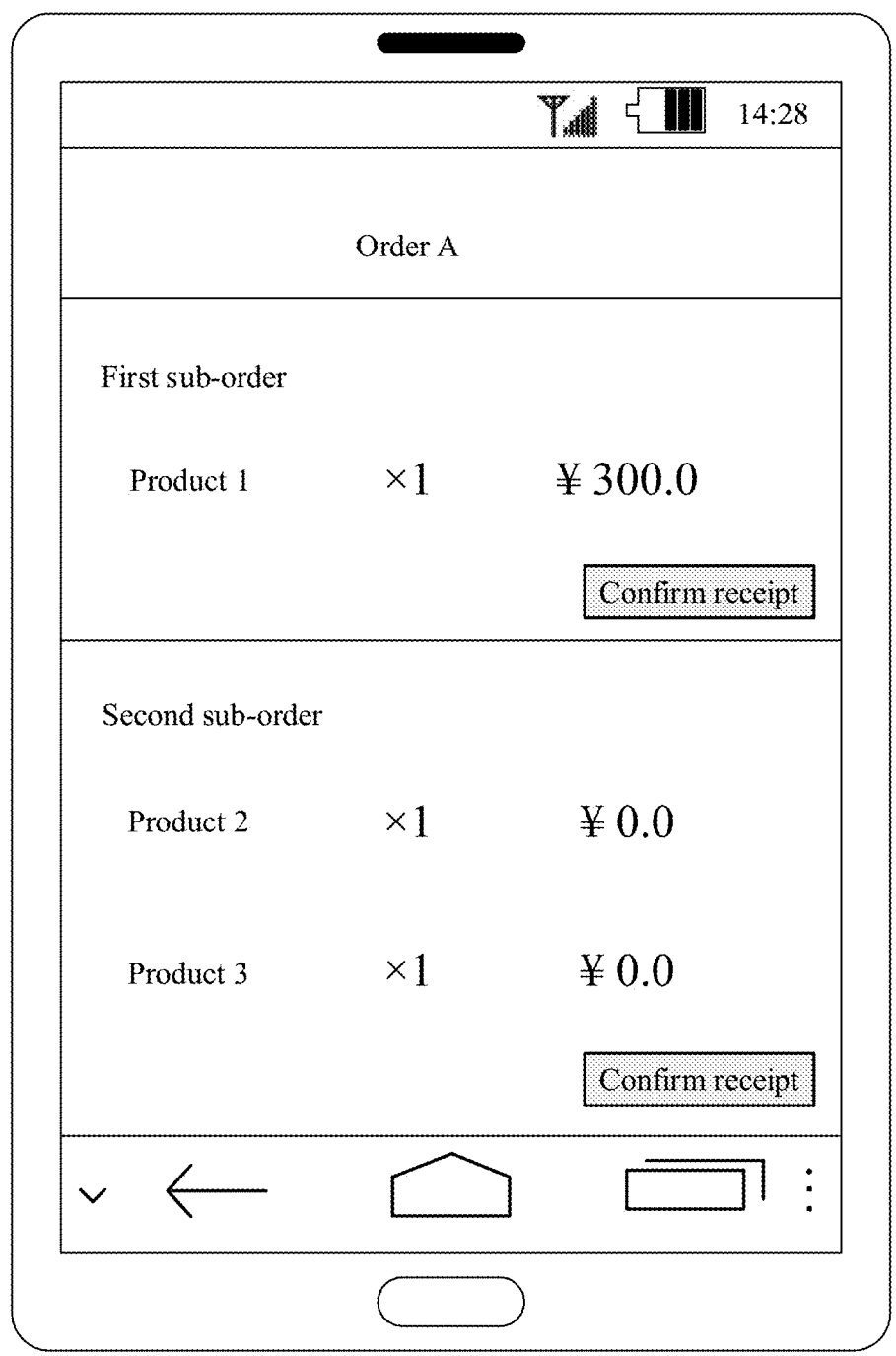
FIG. 3 is a schematic diagram of an application scenario of the method for producing an order according to the present disclosure.

With further reference to FIG. 3, FIG. 3 is a schematic diagram of an application scenario of the method for producing an order according to the present embodiment. In the application scenario of FIG. 3, for order A placed by a user by participating in a purchase and gift activity on a shopping website, the backend server may acquire a product combination in the order A (the product combination includes product 1 and gift product 2 of product 1 and product 3, where product 1 is the main product, product 2 and product 3 are promotional products), and divide the order into a first sub-order and a second sub-order, and the first sub-order may include product 1, and the second sub-order may include product 2 and product 3, as shown in FIG. 3, where product 1 is stored in a first warehouse, and product 2 and product 3 are stored in a second warehouse; then, the backend server may determine a target site for the delivery of the first sub-order and the second sub-order based on receiver address of order A; next, the backend server may calculate a first required time length for transporting the main product (product 1) from the first warehouse to the target site and a second required time length for transporting the promotional products (product 2 and product 3) from the second warehouse to the target site, and finally, the backend server may determine the delivery times for delivering the main product (product 1) and the promotional products (product 2 and product 3) based on the first required time length and the second required time length, to ensure that the time when the main product (product 1) arrives at the target site is not later than the time when the promotional products (product 2 and product 3) arrive at the target site. When product 1, product 2 and product 3 arrive at the target site, the staff may deliver the products to the user.

The method for producing an order provided by the above embodiment of the present disclosure, may divide a received order including a product combination into a first sub-order and a second sub-order, then determine a target site for delivery of the product combination based on receiver address information in the order, after that based on the target site, a first required time length for transporting the main product from the first warehouse to the target site and a second required time length for transporting the promotional product from the second warehouse to the target site, and finally determine, based on the first required time length and the second required time length, a delivery time for delivering the main product and a delivery time for delivering the promotional product, to ensure that the time when the main product arrives at the target site is not later than the time when the promotional product arrives at the target site, thereby preventing users from appropriating promotional products in product combinations and alleviating overstocking of products at a site.

Figure 4:
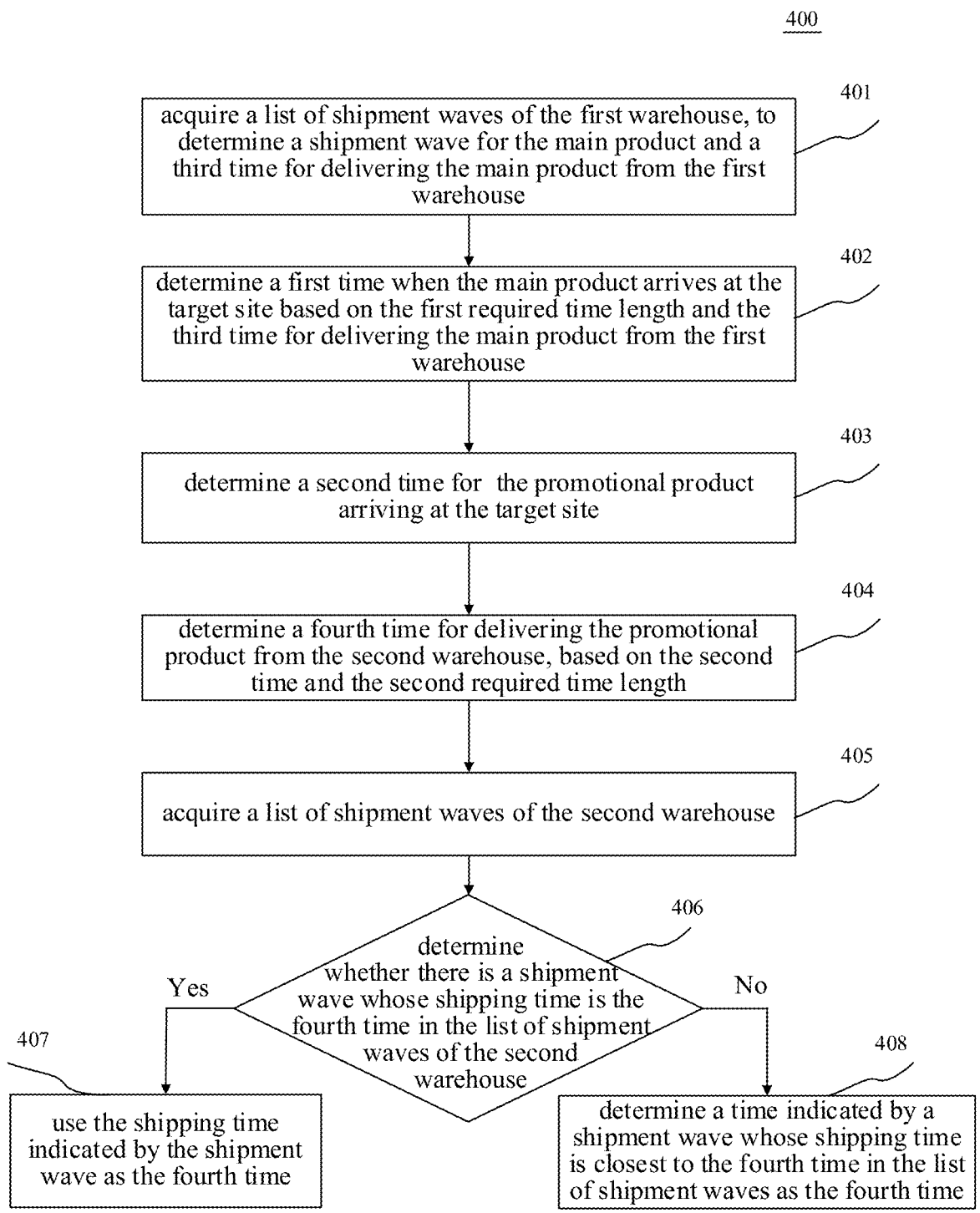
FIG. 4 is a schematic flowchart of an implementation for determining a delivery time for delivering the main product and a delivery time for delivering the promotional product in the method for producing an order of the present embodiment.

In some alternative solutions, as shown in FIG. 4, in step 204, the "determining, based on the first required time length and the second required time length, a delivery time for delivering the main product from the first warehouse and a delivery time for delivering the promotional product from the second warehouse" may be implemented by the following steps:

Step 401, acquiring a list of shipment waves of the first warehouse to determine a shipment wave for the main product and a third time for delivering the main product from the first warehouse.

In this implementation, the electronic device (for example, the server shown in FIG. 1) on which the method for producing an order operates, after determining the first warehouse for delivering the main product, may acquire the list of shipment waves of the first warehouse, and then determine from the list of shipment waves a shipment wave for the main product to be delivered from the first warehouse. Typically, after the first sub-order is transferred to the first warehouse, the shipment wave closest to the current time may be selected from the list of shipment waves as the shipment wave of the main product. Finally, after acquiring the shipment wave of the main product, the electronic device may use the time indicated by the shipment wave as the third time for delivering the main product from the first warehouse.

Typically, the seed-type sorting is a sorting operation that summarizes a batch of a plurality of orders as a unit. The industry usually refers to the batch in operation as a "wave". The warehouse has fixed shipping times for the waves corresponding to the products that need to be delivered every day, so that the list of shipping waves of the warehouse may be generated.

Step 402, determining a first time when the main product arrives at the target site based on the first required time length and the third time for delivering the main product from the first warehouse.

In this implementation, based on the third time for delivering the main product from the first warehouse determined in step 401, the electronic device (for example, the server shown in FIG. 1) may calculate the first time when the main product arrives at the target site based on the first required time length for transporting the main product from the first warehouse to the target site and the third time for delivering the main product from the first warehouse.

Step 403, determining a second time the promotional product arriving at the target site.

In this implementation, based on the first time when the main product arrives at the target site, the electronic device may preset a second time for the promotional product arriving at the target site, where the second time is not later than the first time. Therefore, it is ensured that the time when the promotional product arrives at the target site is not earlier than the time when the main product arrives at the target site.

Step 404, determining a fourth time for delivering the promotional product from the second warehouse, based on the second time and the second required time length.

In this implementation, based on the second time preset in step 403, the electronic device may calculate the time for the promotional product to be delivered from the second warehouse, based on the second required time length for transporting the promotional product from the second warehouse to the target site, and determine the time as the fourth time.

Step 405, acquiring a list of shipment waves of the second warehouse.

In this implementation, after determining the second warehouse for transporting the promotional product, the electronic device may acquire the list of shipment waves of the second warehouse.

Step 406, determining whether there is a shipment wave whose shipping time is the fourth time in the list of shipment waves of the second warehouse.

In this implementation, based on the list of shipment waves of the second warehouse acquired in step 405, the electronic device may acquire the shipping time indicated by each shipment wave. Then, it may be determined whether there is a shipment wave whose indicated shipping time is the fourth time in the shipping waves. If it exists, then it may go to step 407; if it does not exist, then it may go to step 408.

Step 407, using the shipping time indicated by the shipment wave as the fourth time.

In this implementation, based on that there is a shipment wave whose shipping time is the fourth time in the list of shipment waves of the second warehouse determined in step 406, each promotional product may be shipped at the shipment wave, and the electronic device may determine that the shipping time indicated by the shipment wave as the fourth time for delivering the promotional product from the second warehouse. For example, if it is determined that the fourth time for delivering the promotional product from the second warehouse is 10 o'clock, the promotional product and the main product may be made to arrive at the target site at the same time, and according to the list of shipment waves of the second warehouse, it is known that there is a shipment wave of the shipping time 10 o'clock. In this case, the shipping time 10 o'clock indicated by the shipment wave is the fourth time for delivering the promotional product from the second warehouse.

Step 408, determining a time indicated by a shipment wave whose shipping time is closest to the fourth time from the list of shipment waves as the fourth time.

In this implementation, based on there is no shipment wave whose shipping time is the fourth time in the list of shipment waves of the second warehouse determined in step 406, and the electronic device may acquire shipment waves whose shipment times are after the fourth time from the shipment waves of the second warehouse, then select from the shipment waves the shipment wave whose shipment time is closest to the fourth time as the shipment wave of the promotional product, and the shipping time indicated by the determined shipment wave is the fourth time for delivering the promotional product from the second warehouse. For example, if it is determined that the determined fourth time for delivering the promotional product from the second warehouse is 10 o'clock, the promotional product and the main product may be made to arrive at the target site at the same time, however, according to the list of shipment waves of the second warehouse, there is no corresponding shipment wave between 10 o'clock and 10:30, and the shipping time indicated by the shipping wave closest to 10 o'clock and after 10 o'clock in the shipment wave orders is 10:35.

In this case, the shipping time of 10:35 indicated by the shipment wave may be selected as the fourth time for delivering the promotional product from the second warehouse.

Figure 5:
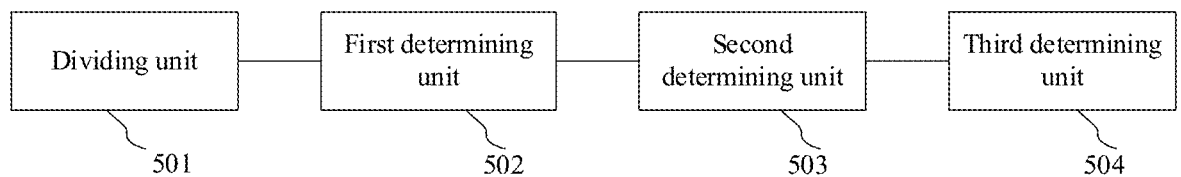
FIG. 5 is a schematic structural diagram of an apparatus for producing an order according to an embodiment of the present disclosure.

With further reference to FIG. 5, as an implementation of the method shown in the above figures, the present disclosure provides an embodiment of an apparatus for producing an order, and the apparatus embodiment corresponds to the method embodiment as shown in FIG. 2, and the apparatus may be specifically applied to various electronic devices.

As shown in FIG. 5, an apparatus 500 for producing an order of the present embodiment includes: a dividing unit 501, a first determining unit 502, a second determining unit 503 and a third determining unit 504. The dividing unit 501 is configured to divide, in response to receiving an order including a product combination sent by a user, the order into a first sub-order and a second sub-order, the first sub-order including at least one main product, the second sub-order including at least one promotional product associated with the main product, and each of the main product in the first sub-order being stored in a first warehouse, and each of the promotional product in the second sub-order being stored in a second warehouse. The first determining unit 502 is configured to determine a target site for delivery of the product combination based on receiver address information in the order. The second determining unit 503 is configured to determine, based on the determined target site, a first required time length for transporting the main product from the first warehouse to the target site and a second required time length for transporting each of the promotional product of the second sub-order from the corresponding second warehouse to the target site. The third determining unit 504 is configured to determine, based on the first required time length and the second required time length, a delivery time for delivering the main product from the first warehouse and a delivery time for delivering the promotional product from the second warehouse, so that a time when the main product arrives at the target site is not later than a time when the promotional product arrives at the target site.

In some alternative implementations of the present embodiment, the dividing unit 501 is further configured to: parse, in response to receiving the order sent by the user, the order to extract at least one main product and a promotional product associated with each of the main product of the product combination; generate at least one first sub-order, so that main products stored in a same first warehouse are included in a same first sub-order; and generate at least one second sub-order, so that promotional products stored in a same second warehouse are included in a same second sub-order.

In some alternative implementations of the present embodiment, the second determining unit 503 is further configured to: acquire address information of the target site, address information of the first warehouse, and address information of the second warehouse; determine, based on the address information of the first warehouse and the address information of the target site, the first required time length for each of the main product transporting from the first warehouse to the target site; and determine, based on the address information of the second warehouse and the address information of the target site, the second required time length for each of the promotional product transporting from the second warehouse to the target site.

In some alternative implementations of the present embodiment, the third determining unit 504 is further configured to: acquire a list of shipment waves of the first warehouse to determine a shipment wave for the main product and a third time for delivering the main product from the first warehouse; determine a first time when the main product arrives at the target site based on the first required time length and the third time for delivering the main product from the first warehouse; determine a second time for the promotional product arriving at the target site, where the second time is not earlier than the first time; and determine a fourth time for delivering the promotional product from the second warehouse, based on the second time and the second required time length.

In some alternative implementations of the present embodiment, the apparatus 500 further includes: a first acquisition unit, configured to acquire a list of shipment waves of the second warehouse; a fourth determining unit, configured to determine whether there is a shipment wave whose shipping time is the fourth time in the list of shipment waves of the second warehouse; and if yes, using the shipping time indicated by the shipment wave as the fourth time; and if no, determining a time indicated by a shipment wave whose shipping time is closest to the fourth time from the list of shipment waves as the fourth time.

In some alternative implementations of the present embodiment, the apparatus 500 further includes: a second acquisition unit, configured to acquire, for any one of the first sub-order, at least one warehouse storing the main product in the first sub-order and storage amount of the main product in each warehouse in which the main product in the first sub-order is stored; and a fifth determining unit, configured to, in response to determining that a number of the main product stored in at least one warehouse in the warehouses storing the main product in the first sub-order meets a demand for a shipment amount of the main product, determine, from the at least one warehouse that meets the demand for the shipment amount of the main product, that a warehouse closest to the target site as the first warehouse corresponding to the first sub-order.

Figure 6:
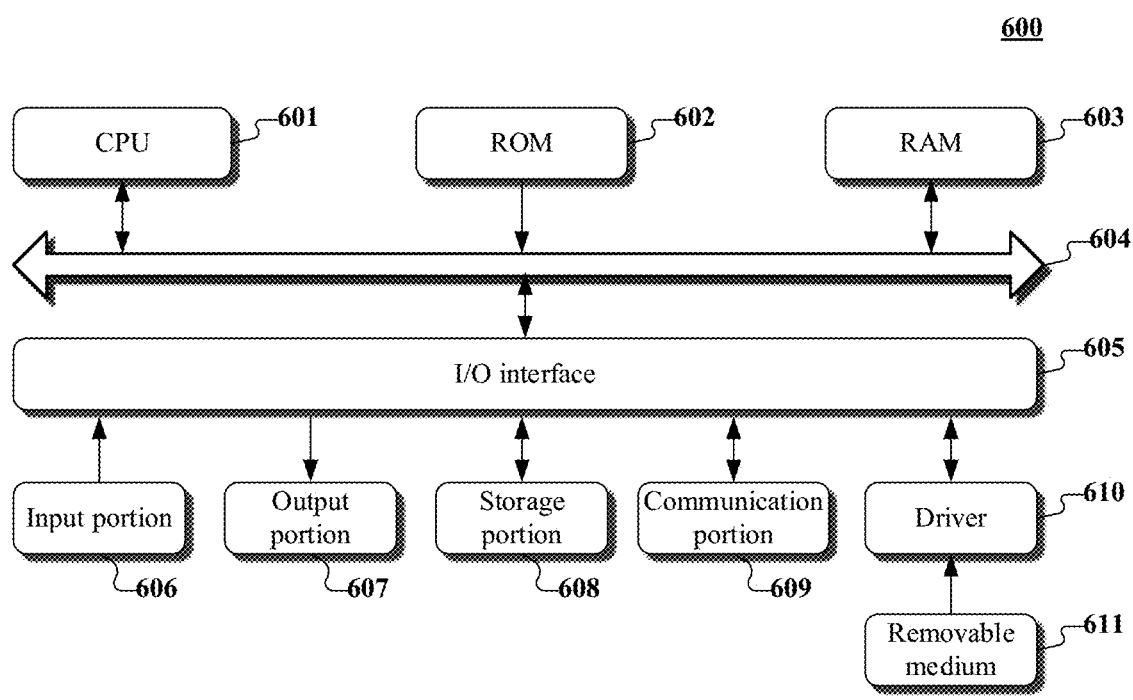
FIG. 6 is a schematic structural diagram of a computer system adapted to implement a terminal device or a server of the embodiments of the present disclosure.

With further reference to FIG. 6, a schematic structural diagram of a computer system 600 adapted to implement the terminal device/server of the embodiments of the present disclosure is shown. The terminal device/server shown in FIG. 6 is merely an example, and should not impose any limitation on the function and scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is hosted in a machine-readable medium. The computer program comprises program codes for executing the method as illustrated in the flow chart. In such an embodiment, the computer program may be downloaded and installed from a network via the communication portion 609, and/or may be installed from the removable medium 611. The computer program, when executed by the central processing unit (CPU) 601, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any tangible medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, comprising a dividing unit, a first determining unit, a second determining unit, and a third determining unit, where the names of these units or modules do not in some cases constitute a limitation to such units or modules themselves. For example, the dividing unit is may also describes as "a unit for dividing, in response to receiving an order comprising a product combination sent by a user, the order into a first sub-order and a second sub-order."

In another aspect, some embodiments of the present disclosure further provide a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: divide, in response to receiving an order comprising a product combination sent by a user, the order into a first sub-order and a second sub-order, the first sub-order comprising at least one main product, the second sub-order comprising at least one promotional product associated with the main product, and each of the main product in the first sub-order being stored in a first warehouse, and each of the promotional product in the second sub-order being stored in a second warehouse; determine a target site for delivery of the product combination based on receiver address information in the order; determine, based on the determined target site, a first required time length for transporting the main product from the first warehouse to the target site and a second required time length for transporting each of the promotional product of the second sub-order from the corresponding second warehouse to the target site; determine, based on the first required time length and the second required time length, a delivery time for delivering the main product from the first warehouse and a delivery time for delivering the promotional product from the second warehouse, so that a time when the main product arrives at the target site is not later than a time when the promotional product arrives at the target site.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for producing an order, the method comprising:
   receiving an order comprising a product combination sent from an electronic device through a wired or wireless connection;
   dividing by a processor the order into a first sub-order and a second sub-order, the first sub-order comprising at least one main product, the second sub-order comprising at least one promotional product associated with the main product, and each of the main product in the first sub-order being stored in a first warehouse, and each of the promotional product in the second sub-order being stored in a second warehouse;
   displaying texts describing the first sub-order and texts describing the second sub-order on a screen of the electronic device;
   determining, by the processor, a target site for delivery of the product combination based on receiver address information in the order;
   calculating by the processor, based on the target site, a first required time length for transporting the main product from the first warehouse to the target site and a second required time length for transporting the promotional product of each second sub-order from a corresponding second warehouse to the target site;
   calculating by the processor, based on the first required time length and the second required time length, a sending time for sending out the main product from the first warehouse and a sending time for sending out the promotional product from the second warehouse, so that a time when the main product arrives at the target site is not later than a time when the promotional product arrives at the target site, comprising:
      acquiring a list of shipment waves of the first warehouse, wherein the first warehouse has fixed times set for the list of shipment waves, products corresponding to a batch of orders are sent out from the first warehouse at each shipment wave;
      selecting a shipment wave for the main product from the list of shipment waves and determining a fixed time setting for the selected shipment wave as a third time for sending out the main product from the first warehouse;
      calculating a first time when the main product arrives at the target site based on the first required time length and the third time for sending out the main product from the first warehouse;
      calculating a second time for the promotional product arriving at the target site, wherein the second time is not earlier than the first time;
      calculating a fourth time for sending out the promotional product from the second warehouse, based on the second time and the second required time length; and
      feeding the calculated sending times back to the electronic device through the wired or wireless connection.

2. The method according to claim 1, wherein the dividing the order into a first sub-order and a second sub-order, comprises:
   parsing, in response to receiving the order sent by the user, the order to extract at least one main product and a promotional product associated with each of the main product of the product combination;
   generating at least one first sub-order, so that main products stored in a same first warehouse are included in a same first sub-order; and
   generating at least one second sub-order, so that promotional products stored in a same second warehouse are included in a same second sub-order.

3. The method according to claim 1, wherein the calculating, based on the target site, a first required time length for transporting the main product from the first warehouse to the target site and a second required time length for transporting the promotional product of each second sub-order from a corresponding second warehouse to the target site, comprises:
   acquiring address information of the target site, address information of the first warehouse, and address information of the second warehouse;
   calculating, based on the address information of the first warehouse and the address information of the target site, the first required time length for each of the main product transporting from the first warehouse to the target site; and
   calculating, based on the address information of the second warehouse and the address information of the target site, the second required time length for each of the promotional product transporting from the second warehouse to the target site.

4. The method according to claim 1, wherein the method further comprises:
   acquiring a list of shipment waves of the second warehouse, wherein the second warehouse has fixed shipping times set for the list of shipment waves, products corresponding to a batch of orders are sent out from the second warehouse at each shipment wave;
   determining whether there is a shipment wave whose shipping time is the fourth time in the list of shipment waves of the second warehouse;
   in response to determining that there is a shipment wave whose shipping time is the fourth time in the list of shipment waves of the second warehouse, using the shipping time indicated by the shipment wave as the fourth time; and
   in response to determining that there is not a shipment wave whose shipping time is the fourth time in the list of shipment waves of the second warehouse, determining a time indicated by a shipment wave whose shipping time is closest to the fourth time from the list of shipment waves as the fourth time.

5. The method according to claim 1, wherein the method further comprises:
   acquiring, for any one of the first sub-order, at least one warehouse storing the main product in the first sub-order and storage amount of the main product in each warehouse in which the main product in the first sub-order is stored; and in response to determining that a number of the main product stored in at least one warehouse in the warehouses storing the main product in the first sub-order meets a demand for a shipment amount of the main product, determining, from the at least one warehouse that meets the demand for the shipment amount of the main product, that a warehouse closest to the target site as the first warehouse corresponding to the first sub-order.

6. The method according to claim 1, wherein the method further comprises:

controlling the first warehouse to send out the main product at the determined third time; and controlling the second warehouse to send out the promotional product at the calculated fourth time.

7. An apparatus for producing an order, the apparatus comprising:

at least one processor; and a memory storing instructions, wherein the instructions when executed by the at least one processor, cause the at least one processor to perform operations, the operations comprising:

receiving an order comprising a product combination sent from an electronic device through wired or wireless connection;

dividing the order into a first sub-order and a second sub-order, the first sub-order comprising at least one main product, the second sub-order comprising at least one promotional product associated with the main product, and each of the main product in the first sub-order being stored in a first warehouse, and each of the promotional product in the second sub-order being stored in a second warehouse;

displaying texts describing the first sub-order and texts describing the second sub-order on a screen of the electronic device;

determining a target site for delivery of the product combination based on receiver address information in the order;

calculating, based on the target site, a first required time length for transporting the main product from the first warehouse to the target site and a second required time length for transporting the promotional product of each second sub-order from a corresponding second warehouse to the target site; and calculating, based on the first required time length and the second required time length, a sending time for sending out the main product from the first warehouse and a sending time for sending out the promotional product from the second warehouse, so that a time when the main product arrives at the target site is not later than a time when the promotional product arrives at the target site, comprises:

acquiring a list of shipment waves of the first warehouse, wherein the first warehouse has fixed times set for the list of shipment waves, products corresponding to a batch of orders are sent out from the first warehouse at each shipment wave;

selecting a shipment wave for the main product from the list of shipment waves and determining a fixed time setting for the selected shipment wave as a third time for sending out the main product from the first warehouse;

calculating a first time when the main product arrives at the target site based on the first required time length and the third time for sending out the main product from the first warehouse;

calculating a second time for the promotional product arriving at the target site, wherein the second time is not earlier than the first time;

calculating a fourth time for sending out the promotional product from the second warehouse, based on the second time and the second required time length; and feeding the calculated sending times back to the electronic device through the wired or wireless connection.

8. The apparatus according to claim 7, wherein the dividing the order into a first sub-order and a second sub-order, comprises:

parsing, in response to receiving the order sent by the user, the order to extract at least one main product and a promotional product associated with each of the main product of the product combination;

generating at least one first sub-order, so that main products stored in a same first warehouse are included in a same first sub-order; and generating at least one second sub-order, so that promotional products stored in a same second warehouse are included in a same second sub-order.

9. The apparatus according to claim 7, wherein the calculating, based on the target site, a first required time length for transporting the main product from the first warehouse to the target site and a second required time length for transporting the promotional product of each second sub-order from the corresponding second warehouse to the target site, comprises:

acquiring address information of the target site, address information of the first warehouse, and address information of the second warehouse;

calculating, based on the address information of the first warehouse and the address information of the target site, the first required time length for each of the main product transporting from the first warehouse to the target site; and calculating, based on the address information of the second warehouse and the address information of the target site, the second required time length for each of the promotional product transporting from the second warehouse to the target site.

10. The apparatus according to claim 7, wherein the operations further comprise:

acquiring a list of shipment waves of the second warehouse, wherein the second warehouse has fixed shipping times set for the list of shipment waves, products corresponding to a batch of orders are sent out from the second warehouse at each shipment wave;

determining whether there is a shipment wave whose shipping time is the fourth time in the list of shipment waves of the second warehouse; and in response to determining that there is a shipment wave whose shipping time is the fourth time in the list of shipment waves of the second warehouse, using the shipping time indicated by the shipment wave as the fourth time; and in response to determining that there is not a shipment wave whose shipping time is the fourth time in the list of shipment waves of the second warehouse, determining a time indicated by a shipment wave whose shipping time is closest to the fourth time from the list of shipment waves as the fourth time.

11. The apparatus according to claim 7, wherein the operations further comprise:
   acquiring, for any one of the first sub-order, at least one warehouse storing the main product in the first sub-order and storage amount of the main product in each warehouse in which the main product in the first sub-order is stored; and
   in response to determining that a number of the main product stored in at least one warehouse in the warehouses storing the main product in the first sub-order meets a demand for a shipment amount of the main product, determining, from the at least one warehouse that meets the demand for the shipment amount of the main product, that a warehouse closest to the target site as the first warehouse corresponding to the first sub-order.

12. A non-transitory computer readable storage medium, storing a computer program thereon, the program, when executed by a processor, cause the processor to perform operations, the operations comprising:
   receiving an order comprising a product combination sent from an electronic device through wired or wireless connection;
   dividing the order into a first sub-order and a second sub-order, the first sub-order comprising at least one main product, the second sub-order comprising at least one promotional product associated with the main product, and each of the main product in the first sub-order being stored in a first warehouse, and each of the promotional product in the second sub-order being stored in a second warehouse;
   displaying texts describing the first sub-order and texts describing the second sub-order on a screen of the electronic device;
   determining a target site for delivery of the product combination based on receiver address information in the order;
   calculating, based on the target site, a first required time length for transporting the main product from the first warehouse to the target site and a second required time length for transporting the promotional product of each second sub-order from a corresponding second warehouse to the target site;
   calculating, based on the first required time length and the second required time length, a sending time for sending out the main product from the first warehouse and a sending time for sending out the promotional product from the second warehouse, so that a time when the main product arrives at the target site is not later than a time when the promotional product arrives at the target site, comprising:
      acquiring a list of shipment waves of the first warehouse, wherein the first warehouse has fixed times set for the list of shipment waves, products corresponding to a batch of orders are sent out from the first warehouse at each shipment wave;
      selecting a shipment wave for the main product from the list of shipment waves and determining a fixed time setting for the selected shipment wave as a third time for sending out the main product from the first warehouse;
      calculating a first time when the main product arrives at the target site based on the first required time length and the third time for sending out the main product from the first warehouse;
      calculating a second time for the promotional product arriving at the target site, wherein the second time is not earlier than the first time;
      calculating a fourth time for sending out the promotional product from the second warehouse, based on the second time and the second required time length; and
   feeding the calculated sending times back to the electronic device through the wired or wireless connection.

13. The medium according to claim 12, wherein the dividing the order into a first sub-order and a second sub-order, comprises:
   parsing, in response to receiving the order sent by the user, the order to extract at least one main product and a promotional product associated with each of the main product of the product combination;
   generating at least one first sub-order, so that main products stored in a same first warehouse are included in a same first sub-order; and
   generating at least one second sub-order, so that promotional products stored in a same second warehouse are included in a same second sub-order.

14. The medium according to claim 12, wherein the calculating, based on the target site, a first required time length for transporting the main product from the first warehouse to the target site and a second required time length for transporting the promotional product of each second sub-order from a corresponding second warehouse to the target site, comprises:
   acquiring address information of the target site, address information of the first warehouse, and address information of the second warehouse;
   calculating, based on the address information of the first warehouse and the address information of the target site, the first required time length for each of the main product transporting from the first warehouse to the target site; and
   calculating, based on the address information of the second warehouse and the address information of the target site, the second required time length for each of the promotional product transporting from the second warehouse to the target site.

15. The medium according to claim 12, wherein the operations further comprise:
   acquiring a list of shipment waves of the second warehouse, wherein the second warehouse has fixed shipping times set for the list of shipment waves, products corresponding to a batch of orders are sent out from the second warehouse at each shipment wave;
   determining whether there is a shipment wave whose shipping time is the fourth time in the list of shipment waves of the second warehouse;
   in response to determining that there is a shipment wave whose shipping time is the fourth time in the list of shipment waves of the second warehouse, using the shipping time indicated by the shipment wave as the fourth time; and
   in response to determining that there is not a shipment wave whose shipping time is the fourth time in the list of shipment waves of the second warehouse, determining a time indicated by a shipment wave whose shipping time is closest to the fourth time from the list of shipment waves as the fourth time.

16. The medium according to claim 12, wherein the operations further comprise:

acquiring, for any one of the first sub-order, at least one warehouse storing the main product in the first sub-order and storage amount of the main product in each warehouse in which the main product in the first sub-order is stored; and in response to determining that a number of the main product stored in at least one warehouse in the warehouses storing the main product in the first sub-order meets a demand for a shipment amount of the main product, determining, from the at least one warehouse that meets the demand for the shipment amount of the main product, that a warehouse closest to the target site as the first warehouse corresponding to the first sub-order.

\* \* \* \* \*